US008505449B2

(12) United States Patent
Lauke et al.

(10) Patent No.: US 8,505,449 B2
(45) Date of Patent: Aug. 13, 2013

(54) ECCENTRIC PRESS WITH DIRECT DRIVE

(75) Inventors: Andreas Lauke, Gruibingen (DE); Jürgen Fahrenbach, Aichelberg (DE)

(73) Assignee: Schuler Pressen GmbH & Co. KG, Göppingen (DE)

( * ) Notice: Subject to any disclaimer, the term of this patent is extended or adjusted under 35 U.S.C. 154(b) by 445 days.

(21) Appl. No.: 12/803,222

(22) Filed: Jun. 22, 2010

(65) Prior Publication Data

US 2010/0320856 A1 Dec. 23, 2010

(30) Foreign Application Priority Data

Jun. 23, 2009 (DE) ......................... 10 2009 029 921

(51) Int. Cl.
*B30B 1/26* (2006.01)
*H02K 7/075* (2006.01)

(52) U.S. Cl.
USPC ............................................... 100/282; 74/49

(58) Field of Classification Search
USPC ................. 100/273, 280, 281, 282, 283, 292, 100/293; 72/443, 449, 450; 74/25, 49, 424.5, 74/490.1, 490.07; 310/80
See application file for complete search history.

(56) References Cited

U.S. PATENT DOCUMENTS

| | | | | |
|---|---|---|---|---|
| 2,831,423 | A * | 4/1958 | Hautau | 100/207 |
| 5,952,755 | A * | 9/1999 | Lubas | 310/156.19 |
| 7,102,316 | B2 * | 9/2006 | Beyer et al. | 318/625 |
| 7,234,337 | B2 * | 6/2007 | Nagae | 72/449 |
| 7,475,584 | B2 * | 1/2009 | Naito et al. | 72/443 |

FOREIGN PATENT DOCUMENTS

| | | | |
|---|---|---|---|
| DE | 199 16 369 | A1 | 10/2000 |
| DE | 41 09 796 | C2 | 5/2002 |
| DE | 10 2004 009 256 | B4 | 4/2008 |
| DE | 10 2006 046 694 | A1 | 4/2008 |
| EP | 1 541 330 | A1 | 12/2003 |
| WO | WO 2004/056559 | A1 | 7/2004 |

* cited by examiner

*Primary Examiner* — Jimmy T Nguyen
(74) *Attorney, Agent, or Firm* — R. S. Lombard; K. Bach

(57) ABSTRACT

A press drive including an electric motor with a stator and a rotor and permanent magnets arranged around the circumference of the rotor. The rotor includes at least one eccentric integrally therewith and rotatably supported with the rotor. The stator is supported on the rotor by bearings arranged adjacent the eccentrics and is held stationary by torque struts.

14 Claims, 5 Drawing Sheets

ECCENTRIC PRESS WITH DIRECT DRIVE

CROSS-REFERENCE TO RELATED APPLICATION

This application claims the priority benefits of German Application No. 10 2009 029 921.1-14 filed Jun. 23, 2009.

BACKGROUND OF THE INVENTION

The invention resides in an eccentric press with a press drive particularly for large component gang presses.

Large-component gang presses are usually driven by an eccentric drive. The drive includes generally several eccentrics which are arranged above the plunger and have axes of rotation which extend parallel to one another. The eccentrics are provided with connecting rods which are connected to the plungers.

While, conventionally, the eccentrics are operated by a central press drive via gears, it has already been proposed to drive the eccentrics by servo-motors. Such an arrangement is shown for example in DE 41 09 796 C2.

Furthermore, DE 10 2004 009 256 B4 discloses a large-component gang press with several servo motors with drive pinions which are in engagement with a circumferential gear structure of the eccentric.

It is the object of the present invention to reduce the mechanical complexity of a press while, at the same time achieving a high operational efficiency.

SUMMARY OF THE INVENTION

The present invention provides a press drive including an electric motor with a stator and a rotor and permanent magnets arranged around the circumference of the rotor. The rotor includes at least one eccentric integrally therewith and rotatably supported with the rotor. The stator is supported on the rotor by bearings arranged adjacent the eccentrics and is held stationary by torque struts.

The press drive according to the invention comprises at least one or also several electric motors which each comprise a stator and a rotor. The stator and the rotor are arranged concentrically. Preferably the rotor is fully or partially cylindrical and is provided at its outer circumference with permanent magnets whereas the stator preferably includes the required coils and flux-conducting elements. In accordance with the invention the eccentric is provided as part of the rotor and is rotatably supported together with the rotor. The rotor and at least one directly adjacent eccentric consequently form a single rigid component which can be designed for optimum rigidity with relatively little use of materials. There is no power transmission via shafts, clutches, gears or other intermediate components. As a result there is not only little complexity to the casting mold, but, in addition a high precision can be achieved regarding the positioning of the eccentric and consequently also regarding the plunger positioning.

In a preferred embodiment, the rotor is provided at its outer circumference with permanent magnets in such a way that they form an uninterrupted string along the complete circumference thereof. Alternatively, if small pressure forces are sufficient, it may be sufficient to provide permanent magnets only over part of the circumference of the rotor, for example, only over 120° or 180°.

In the same way the magnetizing coils are arranged, at least preferably, over the full circumference of the rotor. However, it may under certain conditions be sufficient if the stator coils which generate the driving field extend only over a part of the circumference of the stator or the rotor. This is in particular possible because in all embodiments of the rotor and also the eccentric do not always rotate in the same directional sense. It is rather preferred if the rotor is rotated back and forth in a controlled manner whereby the desired press stroke and the desired travel-time curve for the movement of the plunger is obtained. Since there are many application situations where the plunger needs to provide very different forces along its travel, it may be expedient to provide permanent magnets and operating coils only for those rotational positions of the rotor in which high drive torques are needed, whereas, in other areas much fewer or weaker drive coils and permanent magnets are effective.

In a preferred embodiment the rotor is provided with an eccentric at each of its opposite front ends. This provides for a symmetrical force transmission to the plunger and for symmetrical bearing reaction forces at the rotor bearings. This concept is suitable for the design of rigid high-power presses.

Preferably, the rotor-eccentric-body is a cast component. It consists for example of cast iron. It comprises at least one, but preferably two, eccentrics, which are arranged co-axially. Furthermore, the cast component forms a rotor support structure which is preferably cylindrical at its outer circumference, at least over sections thereof, and whose axis is displaced with regard to the axis of the eccentric. The rotor support structure is provided at parts of its circumference with permanent magnets which form the active part of the rotor of the electric motor.

The stator extends around the rotor preferably over the whole outer circumference thereof with an annular air gap formed therebetween. The air gap has preferably a width of for example less than 10 mm. In a particularly advantageous embodiment the stator is supported directly on the rotor base body. In this way the bearing diameter of the rotor is essentially as large as the outer diameter of the rotor support structure. As a result, the stator is supported via this bearing on the rotor rigidly over the whole circumference. The bearing structure is arranged in close proximity to the air gap. Deformations of the press therefore have no effect on the air gap. Even it the rotor base body is subjected to an elastic deformation, this does not result in a collision between the rotor and the stator. As a result therefore a particularly narrow air gaps and, consequently, high drive forces can be achieved with low weights of the magnets.

In this arrangement, it is advantageous if the stator is connected to the press frame only by way of a torque strut which transmit a circumferential force but is otherwise completely supported rotatably by the rotor or a rotor shaft or axle.

The stator support is therefore a special type of floating bearing or support arrangement with a bearing diameter of about the size of the diameter of the ring formed by the permanent magnets.

Further features and advantageous embodiments of the invention will become more readily apparent from the following description with reference to the accompanying Drawings.

BRIEF DESCRIPTION OF THE DRAWINGS

The drawings disclose further details which are helpful for an understanding of the invention. It is show in.

DESCRIPTION OF PREFERRED EMBODIMENTS

Figure 1:
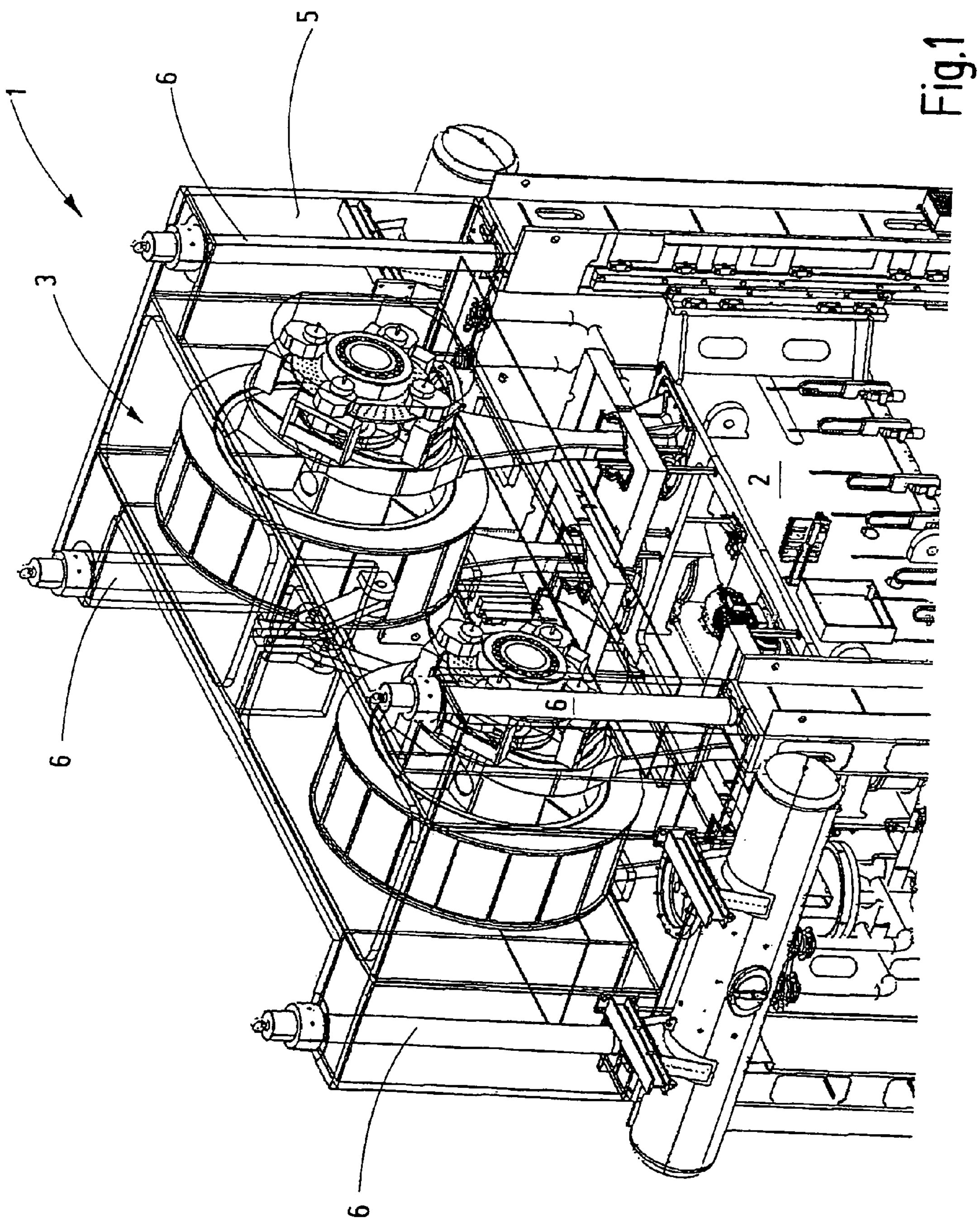
FIG. 1 a large component press according to the invention in a partially transparent perspective representation for an illustration of the installation features of the press drive.

FIG. 1 shows a large component gang press 1 with a press drive 3 including a plunger 2 operated by the press drive for up and down movement. The large component press 1 is merely shown for illustration. The press drive 3 according to the invention may be used in other machines in particular in other types of presses.

The press 1 comprises a press frame with four support parts on which the plunger 2 is vertically linearly movably supported. On top, the four support posts jointly support a press head piece or part 5 which is mounted to the support posts by tension rods 6. The press head piece 5 carries the press drive and, at least partially accommodates it.

Figure 2:
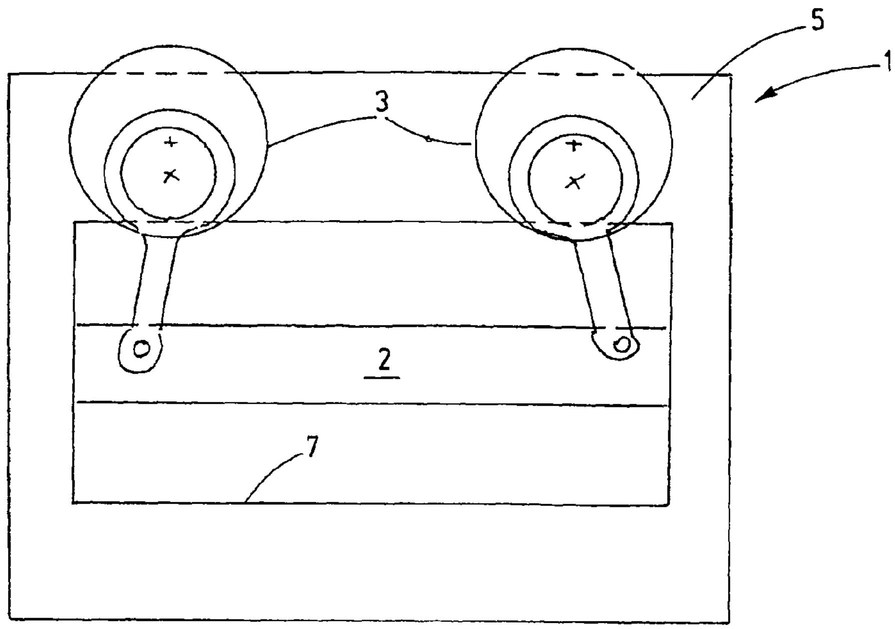
FIG. 2 the press according to FIG. 1 in a schematic front view.

The large component gang press 1 is shown again in FIG. 2 in a simplified way. It shows in particular the press table 7 which is disposed below the plunger 2 and on which the side support posts which carry the head piece 5 are disposed.

Figure 3:
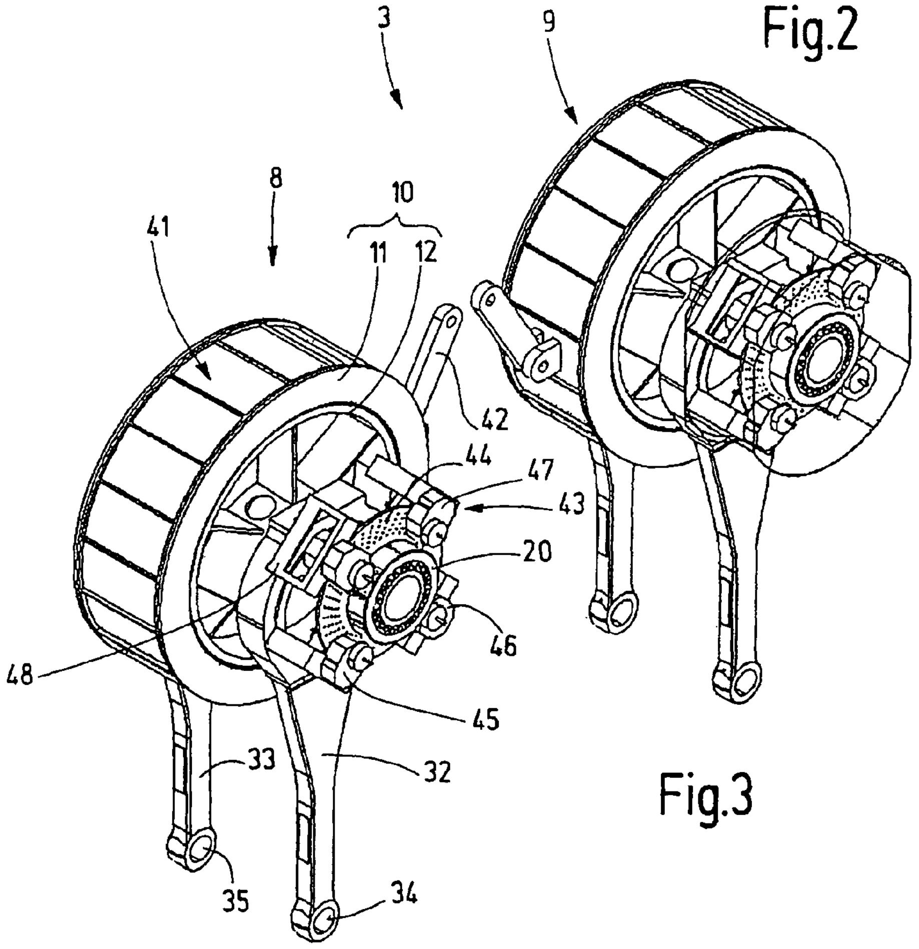
FIG. 3 the press drive of the press of FIG. 1 in a perspective view.

The press drive 3 is shown in FIG. 3. It includes two drive units 8, 9 which are essentially identical. The following description of the drive unit 8 applies therefore correspondingly to the drive unit 9. As noted the drive units 8, 9 may be identical or mirror-reversed identical.

Figure 5:
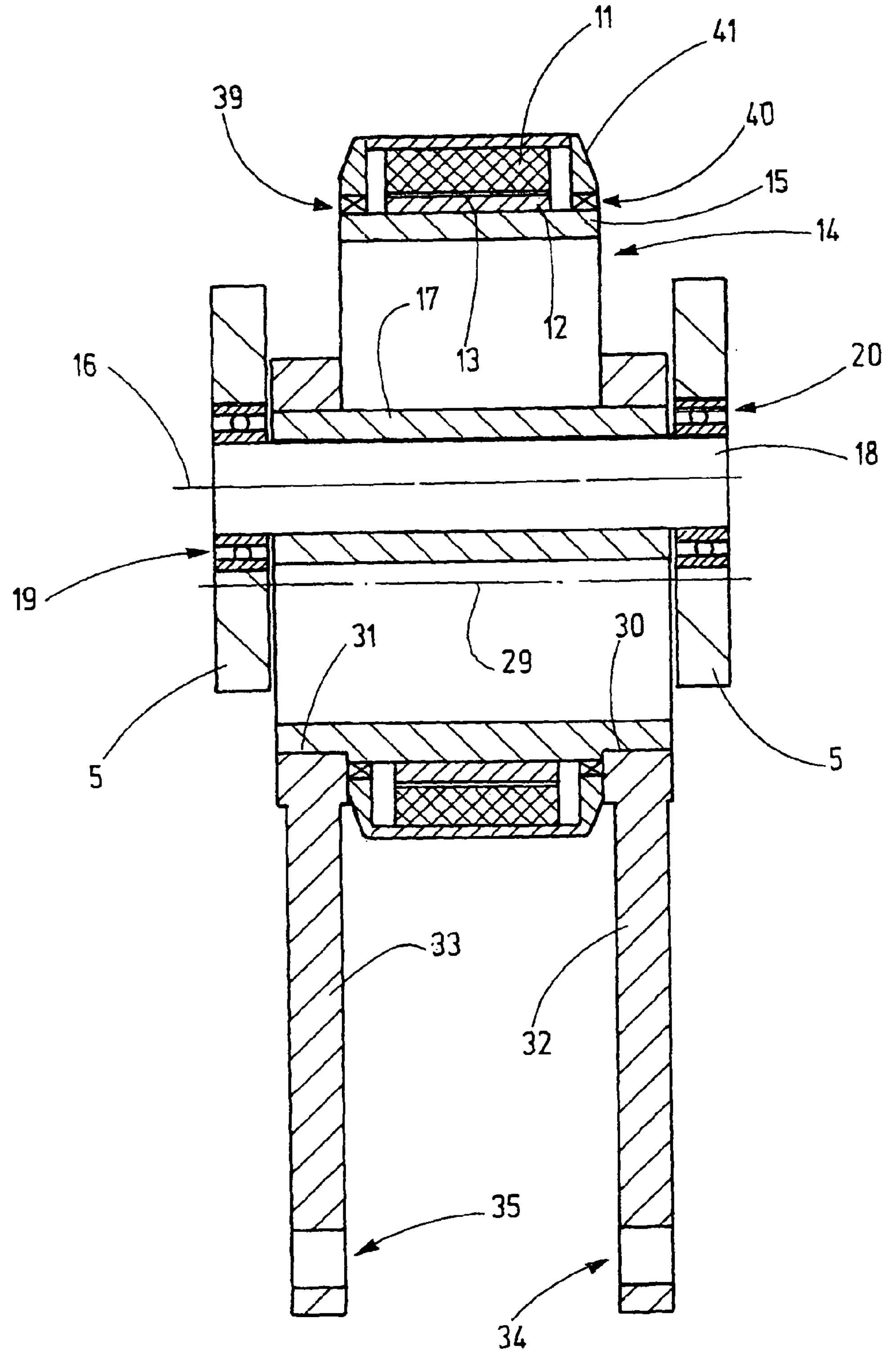
FIG. 5 the press drive in a vertical cross-sectional representation.

The drive unit 8 includes an electric motor 10, which comprises a stator 11 and a rotor 12. Between the stator 11 and the rotor 12 there is an annular air gap 13 as shown in FIG. 5.

Figure 4:
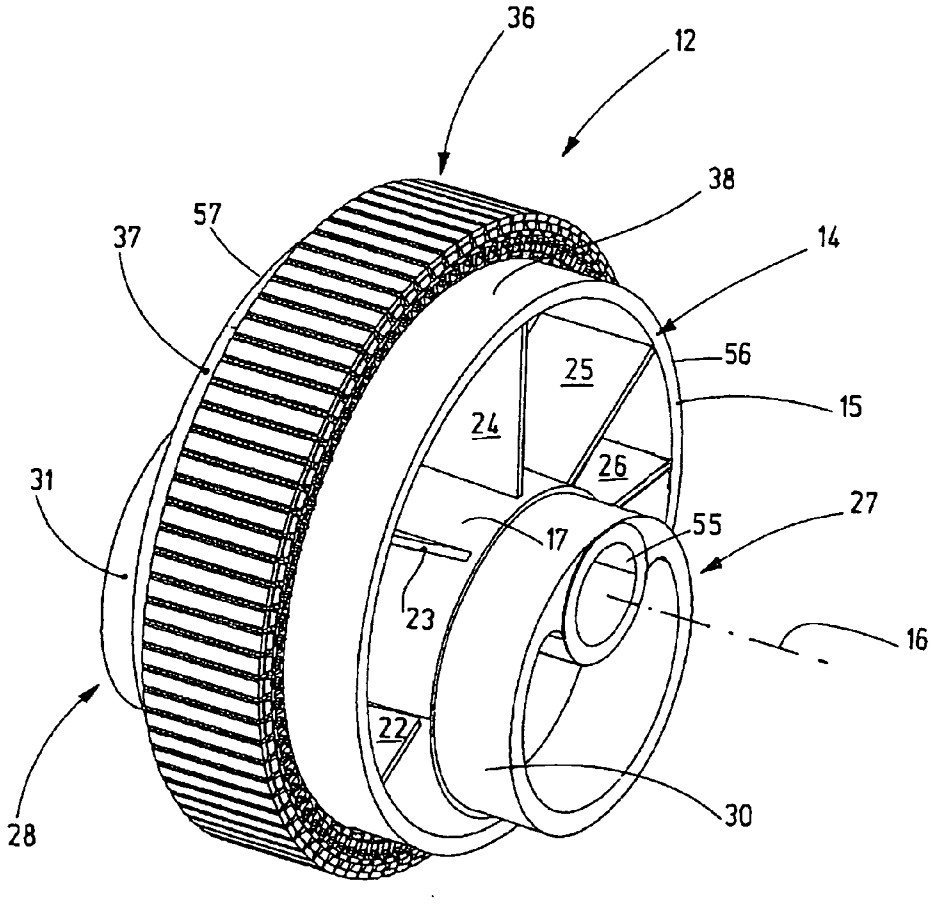
FIG. 4 the rotor with the eccentrics and permanent magnets in a perspective view.

The permanently magnetized rotor 12 is shown separately in FIG. 4. It comprises a basic rotor body 14 which preferably consists of a single part in the form of for example a cast iron part. The rotor base body 14 has oppositely disposed front faces 56, 57. In the shown embodiment the rotor body comprises a hollow-cylindrical sleeve 15 arranged concentrically with the axis 16 of rotation of the rotor 12. The rotor body 14 also includes a hub 17 which is also concentric with the axis of rotation 16 and which is provided for example with a cylindrical through bore 55. In the hub 17 a shaft 18 may be firmly mounted which shaft has ends which are rotatably supported in corresponding bearings 19, 20 in parts of the press head 5 as shown in FIG. 5. Alternatively, the hub 17 may be rotatably supported on a support shaft 21 whose ends are fixedly supported in the press head 5 as shown in FIG. 6.

From the hub 17, web walls 22, 23, 24, 25, 26, as shown in FIG. 4, take on the functions of spokes may radially extend outwardly. By this measure a rigid, rotationally fixed connection between the hub 17 and the sleeve 15 is for example established. The hub 17 may be formed as a single piece with at least one eccentric 27 which axially projects from the sleeve 15. In the exemplary embodiment described here another eccentric 28 is provided at the other front end side of the rotor 12 which is concentric with the eccentric 27. The eccentrics 27, 28 have a common eccentric axis 29 as indicated in FIG. 5. The eccentric 27, 28 may each have the same diameter and be provided at the outside with a cylindrical bearing surface 30, 31. On the bearing surfaces 30, 31 connecting rods 32, 33 are disposed whose lower ends 34, 35 are connected to the plunger 2. The connecting rods extend past the side walls of the sleeve 15 or extend through one or more cut-outs of the sleeve 15.

As shown in FIG. 4 on the rotor base body 14 permanent magnets 36 are arranged over its whole outer circumference in a circumferential gap-less extending over 360°. In the axial direction however, the permanent magnets 36 are noticeably shorter than the sleeve 15 so that at both sides of the row formed by the permanent magnets that is, respectively, the ring formed in this way, annular bearing areas 37, 38 remain free. In the most simple case these bearing surface areas 37, 38 are formed by surface areas of cylindrical sleeve 15, which are left unoccupied by the permanent magnets 36. But it is also possible to distinguish the bearing surfaces 37, 38 by a, for example, an annular, step from the remaining circumferential surface areas by arranging them radially further outwardly or radially further inwardly or by a deviation from a cylindrical form.

Figure 6:
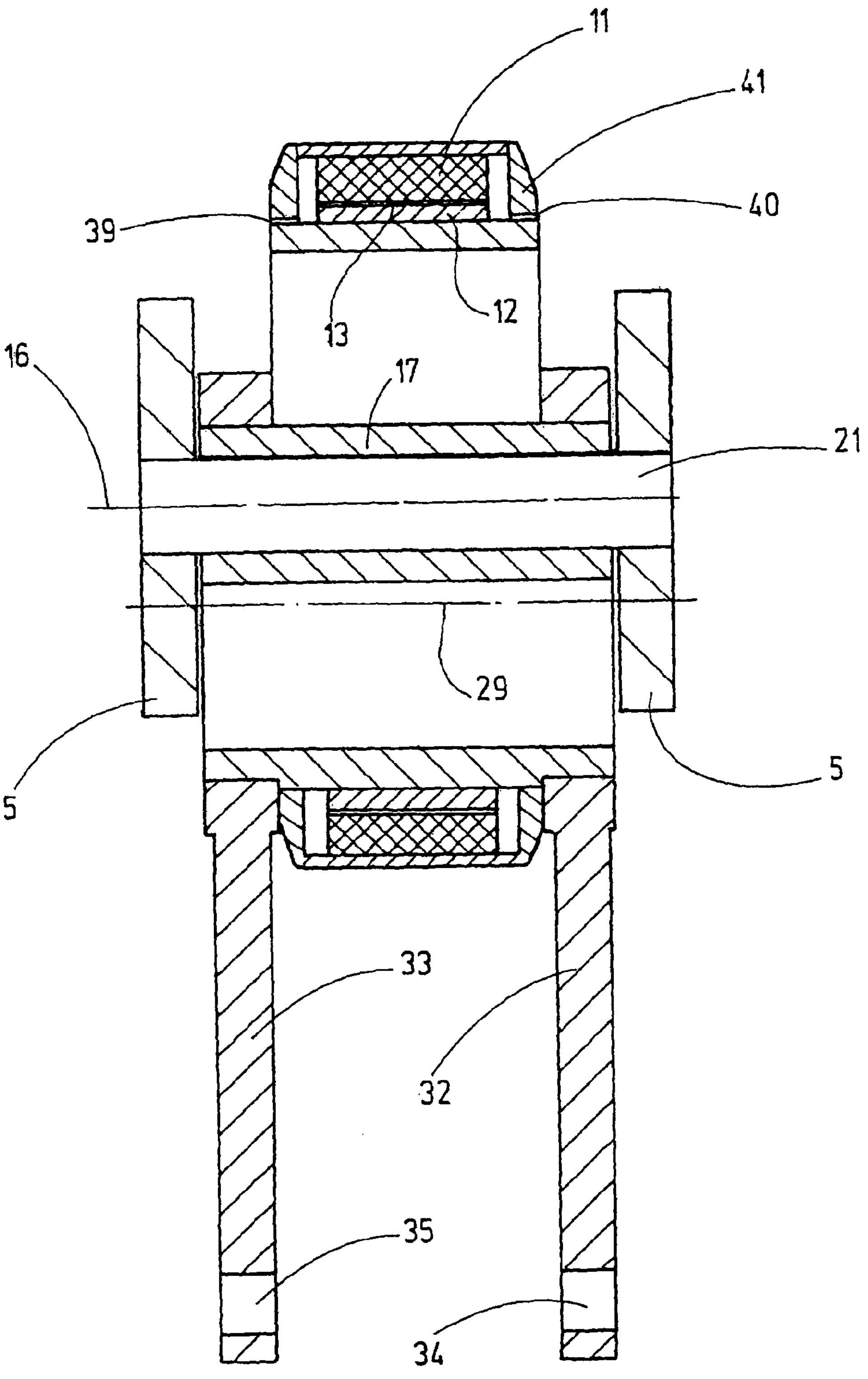
FIG. 6 a modified embodiment of the press drive in a vertical cross-sectional representation.

The bearing surface areas 37, 38 serve as support bearing structures for the stator 11 as it is apparent in particular from FIGS. 5 and 6. At least one, preferably however two bearings 39, 40 are provided which may for example be roller bearings that are supported on bearing surfaces 37, 38. The bearings 39, 40 surround the rotor base body 14 at it outer circumference. They support an annular stator housing 41 which is part of the stator 11 and in which the stator 11 is accommodated. The stator housing 41 is totally supported by the rotor 12. For supporting the drive torque or respectively, the reaction moment a torque strut 42 is provided via which the stator housing 41 is connected to the press head part 5 so as to prevent its rotation. The torque strut 42 is a connecting strut which is pivotally connected at one end to the stator housing 41. Its other end is pivotally connected to the press head part 5.

In the somewhat more detailed FIG. 3, the brake structure 43 is shown which is omitted in FIGS. 5 and 6. It serves for braking down or locking the plunger or respectively the press drive. The brake structure 43 includes a brake disc 44 which is coupled to the rotor 12 for rotation therewith and associated therewith, several brake calibers 45, 46, 47, 48 which are firmly mounted to the press head part 5. They can be firmly engaged for example hydraulically or via spring storage devices for retaining and locking the rotor.

The press drive 3 described so far operates as follows:

During operation the coils of the stator 11 are so energized that the desired drive torque is generated at the rotor. The permanent magnets 36 of the rotor 12 are firmly connected to the rotor base body 14 and consequently transmit the magnetic forces to the rotor base body 14 without losses. When the rotor rotates, also the eccentrics are rotated whereby the connecting rods 32, 33 either lift or lower the plunger 2. Then angular speed and the direction of rotation of the eccentric 30, 31 is controlled by an electrical control unit for the stator 11 which is not specifically shown. By the electric control of the coils of the stator 11 also the force which is to be applied to the plunger 2 can be controlled. The rotor can be operated at a constant direction of rotation and a largely constant rotational speed. It is also possible to change the rotor speed depending on the angular position in order to generate certain desired travel-time relations of the plunger movement. It is also possible to drive the rotor so as to rotate alternatingly back and forth. For example, a movement reversal of the plunger may be provided for in the upper dead center position of the plunger by a reversal of the direction of rotation of the rotor whereas the lower dead center position is provided for without reversal of the rotational direction of the rotor that is by passing through the natural lower dead center. It is however also possible to establish both dead center positions by a reversal of the direction of rotation of the rotor.

In the press drive 3 according to the invention the active elements of the rotor, that is the permanent magnets 36, are arranged directly on the eccentric wheel or on eccentric shaft in the form of the base body of the rotor 14. In this way a desired drive is formed. The stator 11 with its coils is supported on the eccentric wheel and is held to the press body for example to the press head part 5 by at least one torque strut 42.

Reference Numerals

1 large component gang press
2 plunger
3 press drive
5 press-head part
6 tension bolt
7 press table
8, 9 drive units
10 electric motor
11 stator
12 rotor
13 air gap
14 rotor base body
15 sleeve
16 axis of rotation
17 hub
18 shaft
19, 20 bearing, support
21 axle
22-26 web walls
27, 28 eccentric
29 eccentric axis
30, 31 support or bearing surface
32, 33 support or bearing surface
34, 35 ends
36 permanent magnets
37, 38 bearing surface areas
39, 40 bearings
41 stator housing
42 torque strut
43 braking direction
44 brake disc
45, 46 brake calipers
47, 48 brake calipers
55 cylindrical through bore
56, 57 front faces of rotor base body

What is claimed is:

1. A press drive (3) for a press (1), the press (1) including a press plunger (2) supported by a press head piece (5), the press drive (3) comprising:

at least one electric motor including a stator (11) and a rotor (12) which are arranged concentrically;

the rotor (12) including a rotor base body (14) having oppositely disposed front faces (56, 57), the rotor (12) including permanent magnets (36) operatively arranged at the outer circumference of the rotor base body (14);

the rotor (12) including at least one directly adjacent eccentric (27), the at least one directly adjacent eccentric (27) formed as part of and projecting axially from one of the front faces (56, 57) of the rotor base body (14), the rotor base body (14) and the at least one directly adjacent eccentric (27) forming a rotatably supported single rigid component;

the rotor base body (14) including a hub (17) having a cylindrical through bore (55), the cylindrical through bore (55) operatively passing through the single rigid component of the rotor base body (14) and the at least one directly adjacent eccentric (27), a shaft (18) passing through the cylindrical through bore (55) (45) firmly mounted to the hub (17) and including a common bearing structure (19, 20) rotatably supporting the ends of the shaft (18);

at least one connecting rod (32) supported on the at least one directly adjacent eccentric (27) for driving the press plunger (2).

2. The press drive according to claim 1, wherein the outer circumference of the rotor base body (14) is cylindrical and the permanent magnets (36) are operatively arranged along the whole outer circumference of the rotor base body (14).

3. The press drive according to claim 1, wherein the rotor (12) includes two eccentrics (27, 28) arranged at the opposite front faces (56, 57) of the rotor base body (14).

4. The press drive according to claim 1, wherein the rotor base body (14) is a cast component.

5. The press drive according to claim 1, wherein the stator (11) extends around the whole outer circumference of the rotor (12) with an annular air gap (13) formed therebetween.

6. The press drive according to claim 1, wherein the stator (11) is supported on the rotor (12).

7. The press drive according to claim 6, wherein at its outer circumference, the rotor base body (14) is provided with a bearing structure (39, 40) by which the stator (11) is supported.

8. The press drive according to claim 7, wherein the rotor base body (14) is provided, at both sides of the permanent magnets (36) arrangement, with in each case the bearing structure (39, 40) for supporting the stator (11).

9. The press drive according to claim 7, wherein the bearing structure (39, 40) for supporting the stator (11) is arranged between the front faces (46, 47).

10. The press drive according to claim 7, wherein the bearing structure (39, 40) for the stator (11) is a roller bearing or other non-friction bearing.

11. The press drive according to claim 6, wherein the stator (11) further includes an annular stator housing (41) operatively supported by rotor (12), a torque strut (42) is provided having one end connected to the stator housing (41) and the other end connected to the press head piece (5).

12. The press drive according to claim 1, further comprising a brake structure (43) including a brake disc (44) operatively coupled to the rotor (12) for rotation therewith, a plurality of brake calipers (45, 46, 47, 48) are operatively mounted on the press head piece (5).

13. The press drive according to claim 1, wherein the rotor base body (14) includes a hollow-cylindrical sleeve (15) arranged concentrically with the axis of rotation (16) of the rotor base body (14).

14. The press drive according to claim 13, further including a plurality of web walls or spokes (22, 23, 24, 25, 26) in operative rotationally fixed connection between the hub (17) and the hollow-cylindrical sleeve (15).

* * * * *